March 27, 1951 — R. I. SWANSON ET AL — 2,546,796
ELECTRONIC DILATOMETER
Filed May 15, 1947 — 3 Sheets-Sheet 1

Inventor
Warren K. Smith and
Ralph I. Swanson
By Donald G. Dalton
Their Attorney March 27, 1951 R. I. SWANSON ET AL 2,546,796
ELECTRONIC DILATOMETER
Filed May 15, 1947 3 Sheets-Sheet 3

Inventor
Warren K. Smith and
Ralph I. Swanson
Donald G. Dalton
Their Attorney

Patented Mar. 27, 1951

2,546,796

UNITED STATES PATENT OFFICE 2,546,796

ELECTRONIC DILATOMETER

Ralph I. Swanson, Gary, and Warren K. Smith, Indianapolis, Ind., assignors to United States Steel Company, a corporation of New Jersey Application May 15, 1947, Serial No. 748,256

5 Claims. (Cl. 73—16)

This invention relates to dilatometers for measuring the dilation of solid specimens at various temperatures.

The invention has among its objects the provision of an instrument of extreme sensitivity for measuring small increments of expansion and contraction of a test specimen.

A further object of the invention resides in the provision of such instrument in which the sensitivity can be varied accurately to the requirements of the test so that, for example, short critical ranges of the specimen can be recorded on an amplified scale for minute examination.

These and further objects of the invention will be more readily apparent in the following description.

Measurements of the expansion and contraction of solids such as metals in order to determine accurately the thermal properties of such materials is customarily performed by dilatometers. Prior art dilatometers have enclosed the specimen in a furnace and have magnified its linear expansion by a system of mechanical linkages actuated from a push rod in contact with the specimen. Because of the mechanical nature of such linkages, which rely upon levers of amplification of movement, appreciable errors are introduced, primarily due to the looseness at the pivots. The significance of such errors becomes material with decrease in the magnitude of the dimension to be measured, as for example when low expansion alloys of the Invar type are studied.

The dilatometer of the present invention employs an electronic system in the measurement of the changes in dimension of the specimen. In such electronic system, unlike purely mechanical devices, the error does not increase with the increase of amplification or with the decrease in magnitude of expansion or contraction of the specimen. The dilatometer of the invention therefore permits a closer study of the curve of dilation of the material since such portions as desired may be amplified by adjusting the electrical circuit so that such portion of the curve occupies the full scale of the chart instead of, for instance, a few divisions thereof.

The invention will be more readily understood by the accompanyinng drawings in which.

Figure 1:
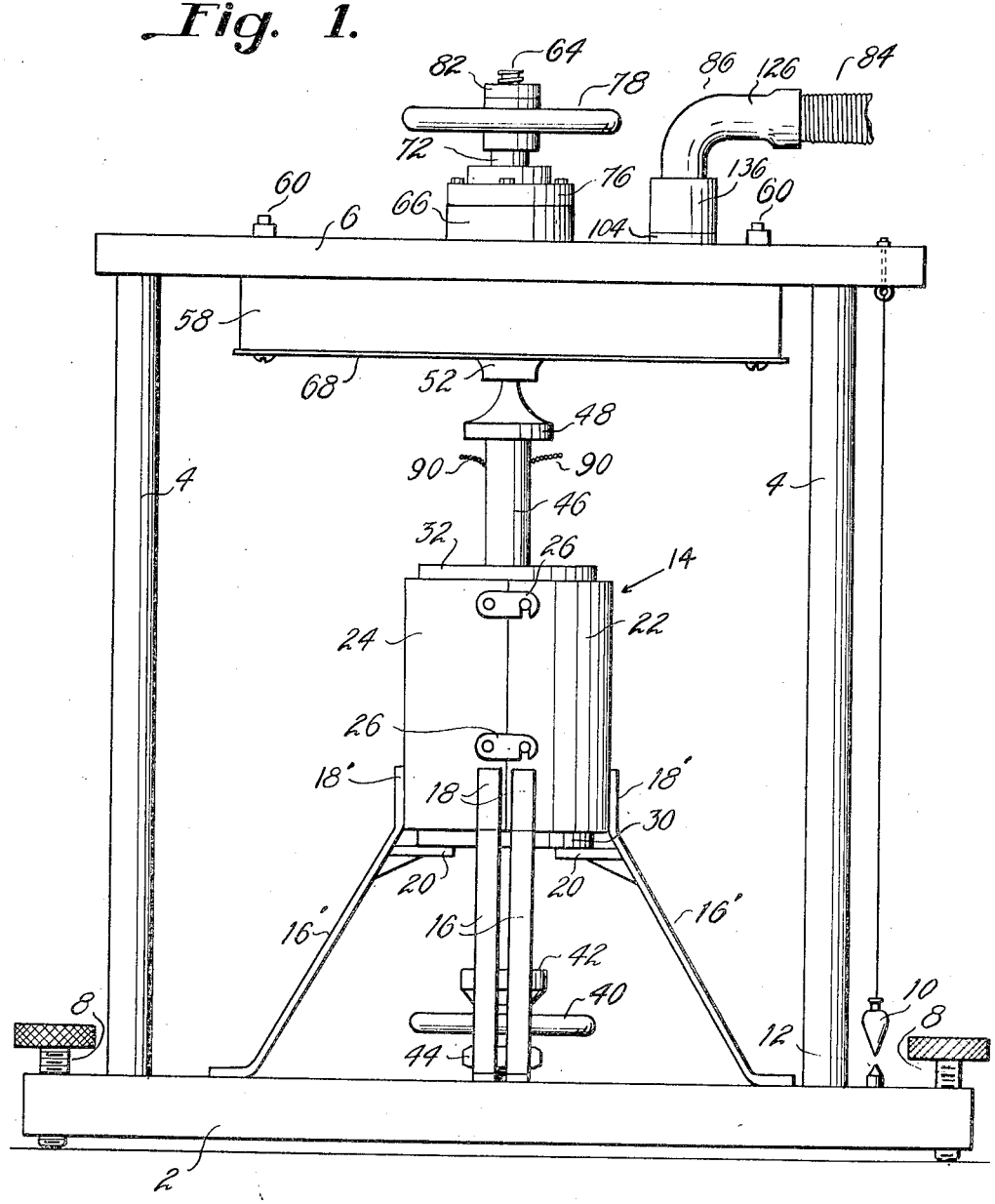
Figure 1 is a view in side elevation of the specimen holding and heating unit of the dilatometer.
Figure 2:
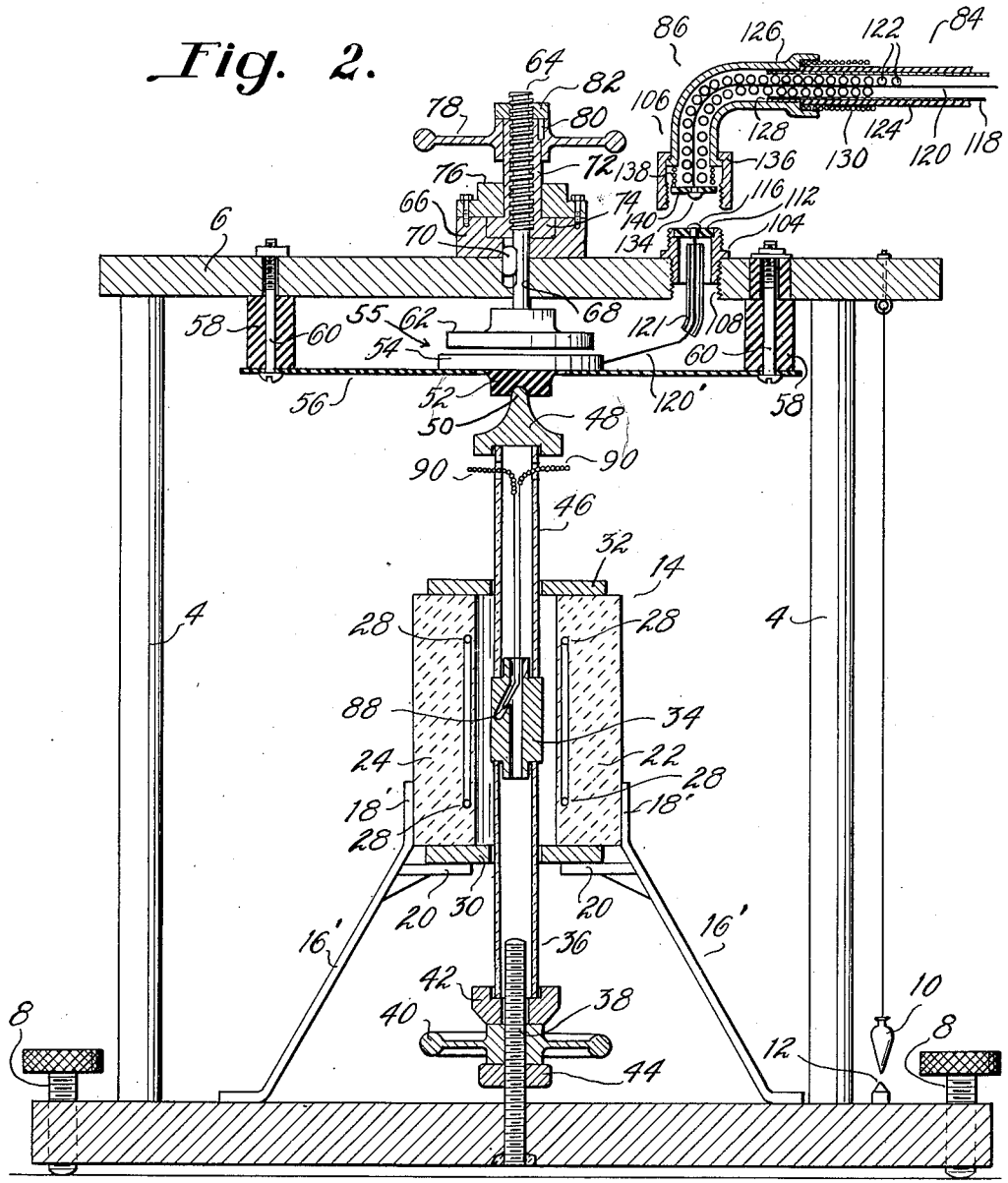
Figure 2 is a view in cross section through the vertical axis of the unit shown in Figure 1.

In the preferred embodiment of the specimen supporting and heating unit of the dilatometer shown in Figures 1 and 2 of the drawings there is provided a vertical frame consisting of the base plate 2, a plurality of vertical, spaced, standards 4, and a horizontal upper plate 6 supported thereby. The base plate is provided with two spaced leveling screws 8 and with a stationary leg, not shown, located near the side edges of the base plate. A plumb bob 10 supported from a line attached to the upper plate 6 cooperate with pointer 12 on the base plate to insure the attainment of the desired level position of such plate.

The specimen to be tested, indicated at 34 in Figure 2, is heated by a furnace generally designated 14, such furnace being supported on the standards 16 and 16', the upper ends 18 and 18' of which are vertical and receive the lower end of the furnace between them. In the embodiment shown two opposite pairs of standards 16 and two single opposed standards 16' are employed. Standards 16' are provided with the horizontal furnace supporting arms 20 extending radially inward, as shown. For ease of assembly and disassembly of the specimen, the specimen support, and the feeler member, the furnace is made in two halves which fit together along a diametral plane. One such part of the furnace is designated 22 and the other 24. The furnace halves are secured together by means of latch means 26 pivoted near the edge of one furnace part and cooperating with studs on the other. Resistance heating wires 28 secured within the furnace halves and supplied from a flexible conduit, not shown, provide a convenient accurate means whereby the specimen may be heated to predetermined temperatures.

The furnace is completed by the disc shaped bottom and top closures 30 and 32, respectively, such closures having axial openings therethrough for the reception of the specimen supporting means and the feeler tube, respectively, about which they fit closely. The test specimen 34, which is generally in the form of a hollow cylinder, is provided with top and bottom shoulders so that such ends interfit with the specimen support and the feeler tube. The specimen support 36 is in the form of a tube, preferably made of fused quartz because of its low coefficient of expansion. Such support is adjustable vertically, such adjustment being provided by the screw 38 affixed to and projecting vertically through base plate 2, the nut 40 mounted on such screw, and the cupped washer 42 which is slidable freely on screw 38 and receives within its cupped upper surface the lower end of tube 36. Tube 36 may be locked in the desired vertical position by means of the locknut 44 cooperating with nut 40.

The feeler member is likewise made in the form of a tube 46, preferably made of fused quartz. The upper end of such tube is provided with cap 48, made of material with a low coefficient of expansion, having a cupped bottom surface receiving the upper end of the tube and a coaxial upper end 50 in the form of a portion of a sphere. End 50 is received with a correspondingly shaped depression in the bearing block 52, which is preferably made of dielectric material. It will be seen, therefore, that changes in length of the specimen in that portion thereof between the ends of the tubes 36 and 46 are accurately transmitted as vertical motions imparted to bearing block 52. Actuation of bearing block 52 as described operates to change the capacity of the variable condenser 55 shown mounted on the top plate 6 of the frame. The structure of such condenser and the means whereby it is mounted and actuated will be clear from the examination of Figure 2.

Mounted on the lower surface of plate 6 in a position coaxial with the specimen is an annular spacer member 58 made of insulating dielectric material. Such spacer is retained on the plate by spaced bolts 60, which also retain the thin diaphragm 56 made of electrically insulating dielectric material such as phenolic resin. Mounted centrally on the diaphragm is the lower plate 54 of the variable condenser. Such plate, may if desired, be made integral with the bearing block 52. Diaphragm 56 is made of such thinness and its lateral dimension is such that it flexes freely in a vertical direction within the limits of motion required by expansion of the specimen.

The upper plate 62 of the variable condenser is adjustably mounted upon plate 6 so that the initial capacity of the condenser may be changed as desired. Plate 62 is mounted upon the lower end of the spindle 64. The upper end of spindle 64 is threaded and the lower end thereof is cylindrical fitting very accurately in the opening 68 through plate 6, which functions as a guide. Spindle 64 is keyed to plate 6 by key 70 which fits into a longitudinal keyway in the lower unthreaded end of the spindle.

Vertical adjustment of the spindle 64 is effected by means of the nut 72 which has a flanged lower end 74 fitting within the central recess in the upstanding cupped member 66, secured to the upper surface of plate 6 as by being welded thereto. Nut 72 is retained in member 66 by means of the washer like retaining member 76 interfitting with the flange 74 on the nut and with the vertical cylindrical surface of the nut. The nut 72 is provided with a handwheel 78 secured to the upper end thereof by key 80, so that turning of the wheel and the nut raises the spindle and thus plate 62 without rotation thereof. The spindle may be located in the desired adjusted position by means of the locknut 82 coacting with the upper end of nut 72. In order to minimize errors which might be introduced into the system by lateral movement of condenser plates 54 and 62 relative to each other, the upper plate 62 is made of smaller diameter than the lower plate 54 as shown.

Electrical connection of the top and bottom plates of the condenser to the other elements of the electrical system is effected by a coaxial cable generally designated 84 which is connected to the condenser plates in the specimen holding and heating unit by the connector generally designated 86. The particular connector shown is one which is commercially sold under the tradename "Amphenol Microphone Connector," which connects the upper plate 62 to the outer tube 118 of the coaxial cable and the lower plate to the inner conductor 120. The coaxial cable, which is used to eliminate the introduction of errors which would occur due to changes in capacity, if ordinary lead wires were used, is provided with insulating beads 122 within the tubular casing 118 which holds the inner conductor 120 in a position coaxial of the casing. The cable is provided with an outer insulating layer 124, such layer being removed in the vicinity of the connector so that tubular casing 118 makes contact with the outer body 126 of the connector. A coil spring 130 is provided adjacent the connector body 126 to stiffen the cable and prevent excessive strain and bending at this point. The axial connection between casing 118 and the connector body 126 is made by a layer of solder 128.

Figure 3:
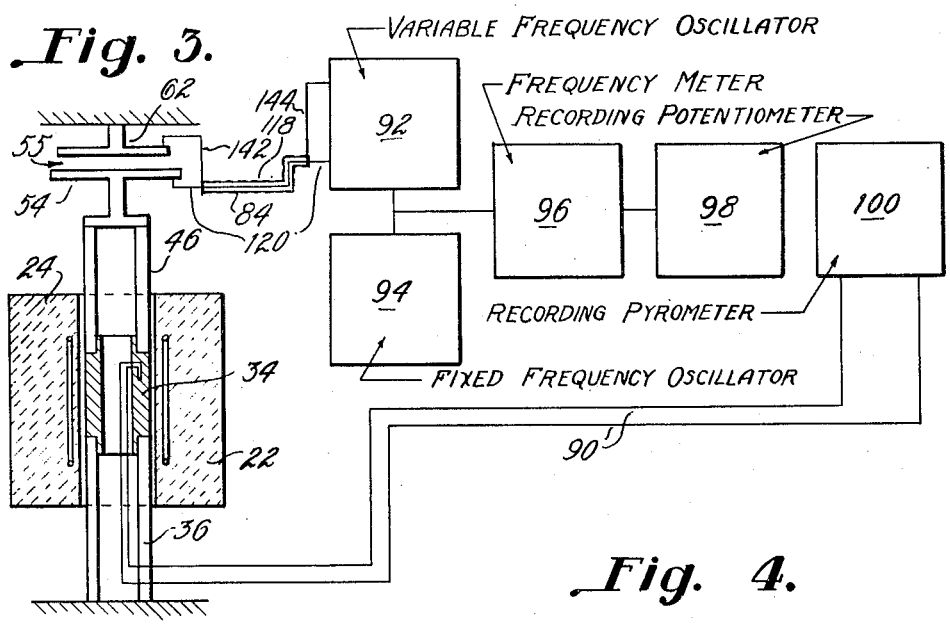
Figure 3 is a schematic layout of the dilatometer unit shown in Figures 1 and 2 and the associated electrical apparatus.

The connector consists of two main parts, the male portion 104 being screwed into a tapped opening 108 in the plate 6 as shown. The female portion 106 is provided with a depending flange nut 136 designed to screw on the top of the male member. An electrical connection is effected between the upper condenser plate 62 and the tubular member 118 of the cable through spindle 64, plate 6, male member 104, female member 106, and connector body 126, all of which are made of metal. The connection between the lower condenser plate 54 and the inner conductor 120 is effected by means of a conductor 120' which runs from the plate 54 to the connecting stud 116 mounted on insulating plate 112 in the upper end of the male member 104. An insulating tube 121 prevents the wire 120' from contacting any other metal part. The nut 136 on the female member carries within it a slidable insulating disc 140 which is urged downwardly by the coil spring 138. Disc 140 carries centrally thereof in a position confronting stud 116 a similar stud 134 attached to the lower end of conductor 120. Thus, when nut 136 is screwed on to the male member 104, a tight contact is made and maintained between studs 116 and 134. In Figure 3 the above described connection between the condenser plates and the variable frequency oscillator 92 is shown diagrammatically, the condenser plate 54 being shown directly connected to oscillator 92 by conductor 120, and the plate 62 being shown connected thereto by the connection 142 (which consists of the outer shell of the microphone shell connector), tubular casing 118 and conductor 144. Connection of the coaxial cable to the oscillator is effected by a similar microphone connector, not shown, and thus connection 144 represents the outer casing of such second microphone connector.

The temperature of the specimen may readily be observed by the provision of a thermocouple 88 positioned in a suitable recess therein, such thermocouple being provided with leads 90 which are conveniently led therefrom through opposite openings in the upper end of the feeler tube 46.

The condenser 55 is one element of the circuit of variable frequency oscillator 92, indicated generally in Figure 3. As the capacity of the condenser 55 changes due to contraction or elongation of specimen 34 and consequently motion of plate 54 of the condenser away from and toward plate 62, respectively, the frequency of the alternating potential generated by the oscillator 92 changes.

In order to measure the change in vertical dimension of the specimen such change or shift in frequency of oscillation must be measured, which is accomplished by electrically coupling the variable oscillator 92 with a constant frequency oscillator 94. The resulting beat frequency is fed to frequency meter 96 which is so constructed as to be sensitive to the subtractive beat frequencies and not the additive beat frequencies. Frequency meter 96 develops a voltage which is proportional to the subtractive beat frequency. The output voltage from the frequency meter is fed to potentiometer 98 which plots a graph of such output voltage against time. The instrument is further conveniently provided with a recording pyrometer 100 connected to thermocouple 88 through the leads 90, such recording pyrometer affording a plot of the temperature of the specimen against time.

Various commercially available units may be employed as the variable and fixed frequency oscillators 92 and 94, respectively, the frequency meter 96, and the recording potentiometer and pyrometer 98 and 100, respectively. In one embodiment of the apparatus the fixed frequency oscillator employed in one manufactured by the General Radio Company and designated Frequency Monitor Type 675–P, described and illustrated on pages 132 and 133 of General Radio Company catalog K, third edition, 1944.

Figure 4:
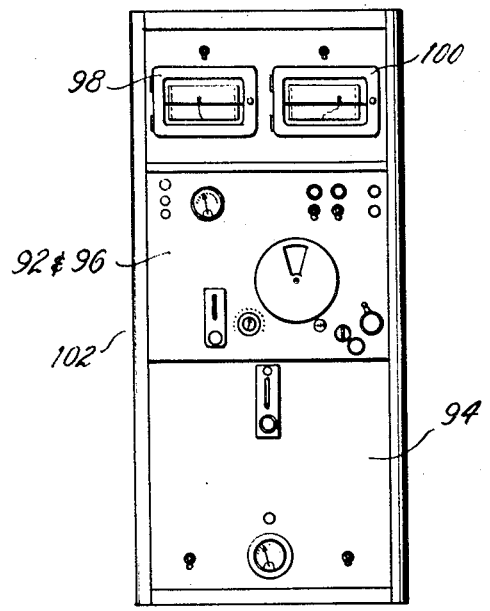
Figure 4 is a view in front elevation of an electrical unit combining the elements of the electrical circuit schematically shown in Figure 3.

In a commercial installation the variable frequency oscillator 92 and the frequency meter 96 are conveniently combined in one unit, as indicated in Figure 4. In the embodiment described such combined unit may conveniently be one likewise manufactured by the General Radio Company, designated Heterodyne Frequency Meter Type 616–D, described and illustrated on pages 134 and 135 of General Radio Company catalog K, third edition, 1944. It is to be understood that other units of the indicated types may be employed instead of those specifically described above. For the recording potentiometer and pyrometer there are employed, in the described embodiment, two commercially available voltage recording devices known as the Leeds & Northrup Micromax.

Although within broad limits the frequency of oscillator 92 does not vary exactly as a straight line function of the distance between condenser plates 54 and 62, in the small portion of such movement employed during the testing of any one specimen such frequency varies with the change of the spacing between plates in an almost exact straight line relationship, particularly with the choice of proper circuit parameters. Thus under the conditions of use of the dilatometer the output voltage of the frequency meter varies directly, for all intents and purposes, as a straight line function of the change in vertical dimension of the specimen, and the chart produced by recording potentiometer 98 may be made to give, upon calibration of the device and the attendant circuits, direct readings of the dimension changes in whatever units desired. Calibration of the instrument will be described below in connection with its operation.

In preparing a test, furnace 14 is dismantled and set aside and nut 40 is backed down to provide the necessary clearance for inserting the test assembly. Thereupon washer 42, pedestal tube 36, and specimen 34 are positioned on the pedestal and nut 40 is advanced to raise the test assembly, upon which feeler tube 46 and cap 48 have been placed, so that point 50 of the cap seats within the recess in bearing block 52.

The vertical advance of nut 40 is continued until bearing block 52 is displaced vertically to a slight extent, to insure accurate bearing of point 50 of the cap in the recess thereof, but not sufficiently to put any material stress in the diaphragm 56. When such adjustment is completed, locknut 44 is set up against nut 40 to lock the pedestal in place.

The foregoing adjustment establishes the starting position of lower condenser plate 54. The next step is to adjust the gap between plates 54 and 62 of the condenser 55. This is accomplished by adjusting the gap between the plates by means of nut 72 until the frequency of the variable frequency oscillator 92, previously adjusted to an experimentally predetermined frequency with the microphone connector 86 disconnected, equals the frequency of the fixed frequency oscillator 94, at which point the frequency meter register "0." Thereupon locknut 82 is set up against nut 72 to lock plate 62 in position. With the test assembly thus set up and the zero position of the frequency meter established, furnace 14 can be positioned around the assembly, the thermocouple 88 connected up, and initial or cold readings taken. The furnace may then be operated to heat the specimen at a predetermined rate, the recording potentiometer and recording pyrometer giving a record of the expansion of the specimen and its temperature, respectively, both plotted against time. The times as recorded by instruments 98 and 100 may be coordinated as by means of simultaneous spark discharges through portions of the charts in the two instruments.

Because of the almost perfect straight line relationship between changes in length of the specimens and the voltage generated by the frequency meter within the limits of use of the device, the dilatometer of the present invention is quite simply calibrated. It is necessary only to determine two points, preferably well spaced, on the straight line of the plot of voltage generated by the frequency meter against change in length of the specimen. Such two points obviously locate the line and all points intermediate therebetween as well as those a substantial distance beyond them in either direction. Suitably one such point may be the zero reading at atmospheric temperature, previously described, and the other a point obtained by displacing upper plate 62 of the condenser 55 an additional known distance very accurately determined through the use of handwheel 78 and the fine screw thread of spindle 64, the voltage developed by the frequency meter thereupon being noted.

The scale on which the chart produced by the recording potentiometer 98 may be changed as desired. The scale of the time coordinate is, of course, changed merely by altering the speed at which the chart passes the recording pen. The scale of the voltage coordinate is determined by the magnitude of the voltage output of the frequency meter. Such magnitude, which may be varied within wide limits, may be set very accurately and remains constant when so set, so that substantially no additional error is introduced into the reading. Thus the dilatometer of the present invention is very flexible, and is free from those sources of error inherently present in dilatometers heretofore employed which make use of mechanically actuated amplifying and recording systems.

Whereas we have described a preferred embodiment of the dilatometer of our invention it is to be understood that the invention is capable of considerable variation as to details. What we claim as new, therefore, is comprehended within the scope of the following claims.

We claim:

1. In an electronic dilatometer a specimen holding and heating unit which comprises a frame having a horizontal base plate, a plurality of vertical standards connected thereto, a spaced horizontal upper plate supported thereby, an adjustable pedestal supported on the base plate, means on such pedestal to support a specimen to be tested, a condenser mounted on the upper plate in line with the pedestal and specimen, the condenser having an upper horizontal plate adjustably mounted on the upper plate of the frame and a lower horizontal plate confronting the upper plate and guided for motion toward and from the upper plate, the means for guiding and positioning said lower condenser plate comprising a dielectric diaphragm of which the plate is mounted, a feeler member between the upper end of the specimen and the lower condenser plate whereby changes in length of the specimen effect changes in the vertical position of such lower plate, and a furnace having a vertical opening therethrough adapted to fit about the specimen and to fit closely the specimen supporting means on the pedestal and the feeler member.

2. In an electronic dilatometer a specimen holding and heating unit which comprises a frame having a horizontal base plate, a plurality of vertical standards connected thereto, a spaced horizontal upper plate supported thereby, an adjustable pedestal supported on the base plate, a vertical quartz member on such pedestal to support a specimen to be tested, a condenser mounted on the upper plate in line with the pedestal and specimen, the condenser having an upper horizontal plate adjustably mounted on the upper plate of the frame and a lower horizontal plate confronting the upper plate and guided for motion toward and from the upper plate, the means for guiding and positioning said lower condenser plate comprising an annular spacing member surrounding the condenser plates and secured to the upper plate of the frame, a dielectric diaphragm secured across the lower edge of the spacing member, the lower condenser plate being secured to the diaphragm centrally thereof, a quartz feeler member between the upper end of the specimen and the lower condenser plate whereby changes in length of the specimen effect changes in the vertical position of such lower plate, and a furnace having a vertical opening therethrough adapted to fit about the specimen and to fit closely the specimen supporting means on the pedestal and the feeler member.

3. In an electronic dilatometer a specimen holding and heating unit which comprises a frame having a horizontal base plate, a plurality of vertical standards connected thereto, a spaced horizontal upper plate supported thereby, an adjustable pedestal supported on the base plate, a vertical quartz member on such pedestal to support a specimen to be tested, a condenser mounted on the upper plate in line with the pedestal and specimen, the condenser having an upper horizontal plate adjustably mounted on the upper plate of the frame and lower horizontal plate confronting the upper plate and guided for motion toward and from the upper plate, the means for guiding and positioning said lower condenser plate comprising an annular spacing member surrounding the condenser plates and secured to the upper plate of the frame, a dielectric diaphragm secured across the lower edge of the spacing member, the lower condenser plate being secured to the diaphragm centrally thereof, a quartz feeler member between the upper end of the specimen and the lower condenser plate whereby changes in length of the specimen effect changes in the vertical position of such lower plate, and a furnace having a vertical opening therethrough adapted to fit about the specimen and to fit closely the specimen supporting means on the pedestal and the feeler member, the frame being provided with frame leveling means, such means comprising at least two spaced leveling screws engaging a base support and a plumb bob dependent from an upper portion of the frame.

4. An electronic dilatometer comprising a furnace having an opening through a wall thereof, means to support a specimen to be tested in the furnace, a condenser mounted substantially in line with said furnace opening, the condenser having a relatively fixed plate and a relatively movable plate between the relatively fixed plate and the furnace, a dielectric diaphragm for supporting said movable plate, means interposed between the specimen and the movable condenser plate for moving such plate in accordance with changes in a dimension of the specimen, said last named means comprising a member bearing on the end of said specimen, a cap mounted on said member and a ball and socket connection between said cap and said diaphragm, a variable frequency oscillator in the oscillating circuit of which the condenser is connected, and means to detect a change in frequency of the oscillator upon movement of the movable condenser plate relative to the fixed condenser plate.

5. An electronic dilatometer comprising a furnace having an opening through the upper wall thereof, means on which the specimen rests to support it in the furnace for testing, a condenser mounted above the furnace substantially in line with said furnace opening, the condenser having an upper, relatively fixed plate and a lower, relatively movable plate, a substantially horizontal dielectric diaphragm for supporting said lower plate, a member mounted on the upper end of said specimen in alignment therewith, a cap mounted on said member, a ball and socket connection between said cap and said diaphragm, said lower plate being moved in accordance with changes in height of the specimen, a variable frequency oscillator in the oscillating circuit of which the condenser is connected, means to detect a change in frequency of the oscillator upon movement of the lower condenser plate relative to the first condenser plate, and means fed by the last named means to give a direct reading of the change in height of the specimen.

RALPH I. SWANSON.
WARREN K. SMITH.

REFERENCES CITED

The following references are of record in the file of this patent:

UNITED STATES PATENTS

| Number | Name | Date |
|---|---|---|
| 1,716,796 | Rockwell | June 11, 1929 |
| 2,322,681 | Zenor | June 22, 1943 |
| 2,351,572 | Kingston | June 13, 1944 |
| 2,367,866 | Humphreys et al. | Jan. 23, 1945 |
| 2,409,669 | Dietert | Oct. 22, 1946 |